（12）United States Patent
Razvi et al.

(10) Patent No.: US 7,653,661 B2
(45) Date of Patent: Jan. 26, 2010

(54) MONITORING CONNECTION BETWEEN COMPUTER SYSTEM LAYERS

(75) Inventors: Nadim Razvi, Speyer (DE); Gerald Krause, Lorsch (DE)

(73) Assignee: SAP AG, Waldorf (DE)

( * ) Notice: Subject to any disclaimer, the term of this patent is extended or adjusted under 35 U.S.C. 154(b) by 374 days.

(21) Appl. No.: 11/618,454

(22) Filed: Dec. 29, 2006

(65) Prior Publication Data
US 2008/0162546 A1 Jul. 3, 2008

(51) Int. Cl.
*G06F 17/00* (2006.01)
(52) U.S. Cl. .................. 707/104.1; 707/10; 709/224; 709/234
(58) Field of Classification Search ................ None
See application file for complete search history.

(56) References Cited

U.S. PATENT DOCUMENTS

| | | | | | |
|---|---|---|---|---|---|
| 5,758,077 | A | * | 5/1998 | Danahy et al. | 709/201 |
| 5,781,735 | A | * | 7/1998 | Southard | 709/224 |
| 6,144,961 | A | * | 11/2000 | de la Salle | 707/10 |
| 6,846,684 | B1 | * | 1/2005 | Yazback et al. | 438/14 |
| 2002/0010803 | A1 | * | 1/2002 | Oberstein et al. | 709/318 |
| 2003/0018555 | A1 | * | 1/2003 | Callan et al. | 705/35 |
| 2003/0033155 | A1 | * | 2/2003 | Peerson et al. | 705/1 |
| 2003/0052615 | A1 | * | 3/2003 | Lynch et al. | 315/169.3 |
| 2004/0006537 | A1 | * | 1/2004 | Zelechoski et al. | 705/39 |
| 2004/0051740 | A1 | | 3/2004 | Reichel et al. | |
| 2004/0054640 | A1 | | 3/2004 | Reichel et al. | |
| 2005/0055368 | A1 | * | 3/2005 | Bruening et al. | 707/102 |
| 2005/0120051 | A1 | * | 6/2005 | Danner et al. | 707/104.1 |
| 2006/0190486 | A1 | * | 8/2006 | Zhou et al. | 707/104.1 |
| 2006/0242160 | A1 | * | 10/2006 | Kanchwalla et al. | 707/100 |

OTHER PUBLICATIONS

Solte et al., "Federated Management of Distributed Data and Services", *Computers in Industry*, Dec. 2000, vol. 43, pp. 203-210.
'Service Abstraction Layer' [online]. Vogel, 2001, [retrieved on Apr. 15, 2005]. Retrieved from the Internet: <URL: www.web.archive.org/web/20011123061722/http://www.hillside.net/patterns/EuroPLoP2001/papers/Vogel.zip>, 15 pages..

* cited by examiner

*Primary Examiner*—Pierre M Vital
*Assistant Examiner*—Augustine Obisesan
(74) *Attorney, Agent, or Firm*—Fish & Richardson P.C.

(57) ABSTRACT

Monitoring a connection between computer system layers includes detecting that an aspect is being modified in a transactional layer of an enterprise resource computing system that further includes an analytical layer configured to receive data from the transactional layer. In response to the detection, it is determined whether at least one of several decoupling components, configured for use by the analytical layer in receiving the data, is implicated by the aspect. A predefined output is made to a user based on the determination. An enterprise resource computing system includes a transactional layer and an analytical layer, and decoupling components for use by the analytical layer in receiving the data. Upon an aspect of the transactional layer being modified, a predefined output is made to a user based on a determination of whether any of several decoupling components is implicated by the aspect.

19 Claims, 5 Drawing Sheets

MONITORING CONNECTION BETWEEN COMPUTER SYSTEM LAYERS

TECHNICAL FIELD

This document relates to a computer system organized in layers.

BACKGROUND

Many computer systems include components that can be characterized as a backend and frontend, respectively. Typically, the backend processes and stores data, among other functions, and the frontend is responsible for presenting the backend data and allowing users to manipulate it when applicable. For example, the R/3 system from SAP AG in Walldorf, Germany is a backend system that is capable of handling many different types of data processing and management in an enterprise resource planning (ERP) environment, such as operations related to customer relationship management (CRM), to name just one example. Moreover, SAP provides a Business Warehouse (BW server) system that offers data repository management functions that can be used in connection with the backend. For example, the BW server lets users formulate queries that can be run on various data repositories of backend data. The BW server also provides visual displays for presenting query results in formats that are most suitable for the various users of the system. These visual displays that present operational data to a user may be referred to as reports, because they are akin to a traditional paper-based business report.

Existing systems have been configured to provide transactional processing, for example in form of one or more application programs being executed in the backend. Some systems are also configured to provide analytical services, such as to provide the type of reports that can be generate by the BW server. The transactional and/or analytical features are often configured for the specific customer implementation, because each customer's needs and preferences may vary.

SUMMARY

In a first aspect, a computer-implemented method for monitoring a connection between computer system layers includes detecting that an aspect is being modified in a transactional layer of an enterprise resource computing system. The enterprise resource computing system further includes an analytical layer configured to receive data from the transactional layer. The method includes determining, in response to the detection, whether any of several decoupling components is implicated by the aspect. The decoupling components are configured for use by the analytical layer in receiving the data. The method includes making a predefined output to a user based on the determination.

Implementations can include any, all or none of the following features. The decoupling components can be created before delivery of the enterprise resource computing system and can be included in the enterprise resource computing system at the delivery as preconfigured content. The method can further include receiving configuration changes to the transactional and analytical layers after the delivery and before the enterprise resource computing system is put to use. The detection can be made of a modification selected from the group consisting of: creation of an object; modification of an existing object; creation of a process; and modification of an existing process. The determination can indicate that none of the decoupling components are implicated by the aspect, and the predefined output can indicate that a new decoupling component can be created. The determination can indicate that at least one of the decoupling components is implicated by the aspect, and the predefined output can identify the at least one implicated decoupling component. The method can further include receiving an additional modification of the transactional layer in response to making the predefined output. The additional modification can establish a logical connection between the identified decoupling component and the modified aspect. The modification of the aspect can be done as part of a configuration process for the enterprise resource computing system, and the predefined output can be generated in a subsequent part of the configuration process. The analytical layer can include at least one entity selected from the group consisting of: a key performance indicator variable, a report, and a group of relational tables. The entity can be built on at least one of the decoupling components. Each of the decoupling components can be a link between at least one entity in the transactional layer and at least one entity in the analytical layer.

In a second aspect, an enterprise resource computing system includes a transactional layer and an analytical layer configured to receive data from the transactional layer. The enterprise resource computing system further includes decoupling components for use by the analytical layer in receiving the data. Upon an aspect of the transactional layer being modified, a predefined output is made to a user based on a determination of whether any of the decoupling components is implicated by the aspect.

Implementations can include any, all or none of the following features. The decoupling components can be created before delivery of the enterprise resource computing system and included in the enterprise resource computing system at the delivery as preconfigured content. Configuration changes to the transactional and analytical layers can be received after the delivery and before the enterprise resource computing system is put to use. The modification can be selected from the group consisting of creation of an object; modification of an existing object; creation of a process; and modification of an existing process. The determination can indicate that none of the decoupling components are implicated by the aspect, and the predefined output can indicate that a new decoupling component can be created. The determination can indicate that at least one of the decoupling components is implicated by the aspect, and the predefined output can identify the at least one implicated decoupling component. An additional modification of the transactional layer can be received in response to the predefined output. The additional modification can establish a logical connection between the identified decoupling component and the modified aspect. The modification of the aspect can be done as part of a configuration process for the enterprise resource computing system, and the predefined output can be generated in a subsequent part of the configuration process. The analytical layer can include at least one entity selected from the group consisting of: a key performance indicator variable, a report, and a group of relational tables. The entity can be built on at least one of the decoupling components. Each of the decoupling components is a link between at least one entity in the transactional layer and at least one entity in the analytical layer.

Implementations can provide any, all or none of the following advantages: Providing increased flexibility in a layered computer system. Providing improved handling of modifications in a transactional layer. Providing that modifications in a transactional layer do not require an associated analytical layer to be modified. Providing decoupling components that can be shipped with an enterprise resource computing system upon delivery.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
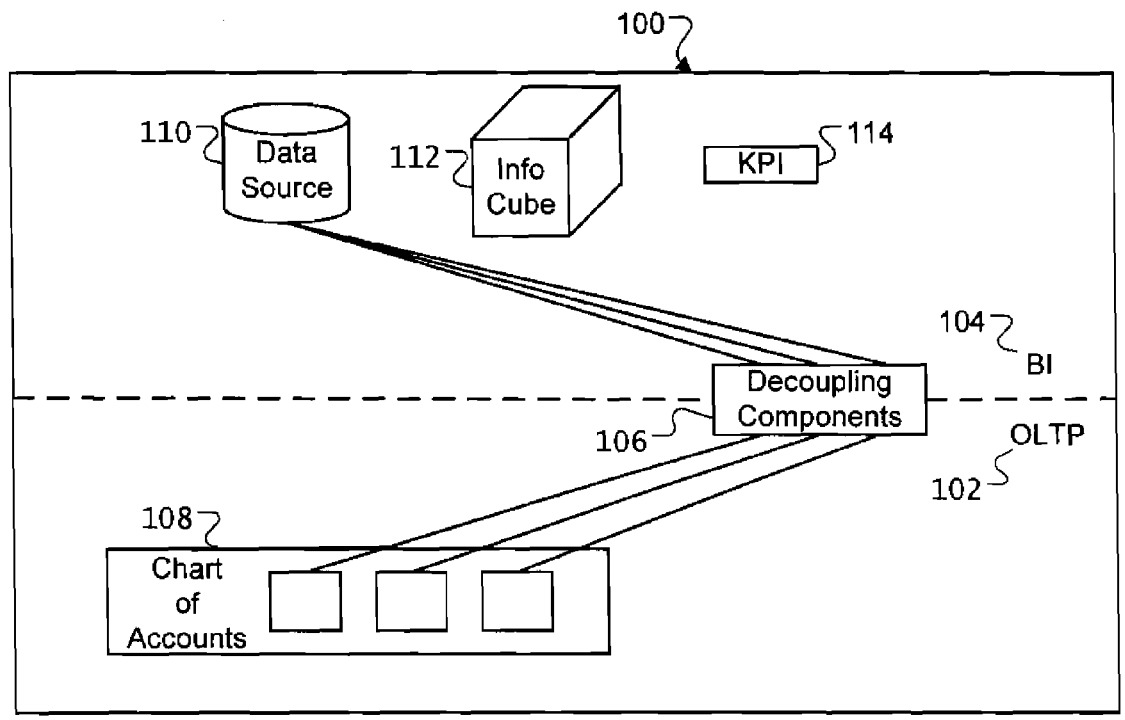
FIG. 1 is a component diagram of an exemplary enterprise resource computing system.

FIG. 1 is a block diagram of some components of an exemplary enterprise resource computing system 100. Such systems can be used to consolidate and unify some or all of the data belonging to an organization. An example of such a system is the mySAP ERP system from SAP AG. The mySAP system includes packages for Financials, Human Capital Management, Operations, and Corporate Services, to name a few examples.

The system 100 contains a transactional layer 102. The transactional layer 102 may operate using a processing technique known as Online Transactional Processing (OLTP). The transactional layer 102 may be responsible for data entry and retrieval. For example, the transactional layer 102 may maintain and process sales orders, service orders, service contracts, customer invoices, tax records, employee information and many other types of data. The transactional layer 102 may further allow other programs to access the data.

The system also contains an analytical layer 104. The analytical layer 104 may include a Business Intelligence (BI) layer, for example as used in SAP systems. The analytical layer 104 consumes data from the transactional layer 102. The data may then be stored, examined, and manipulated to produce reports and numerical values that are useful for managing the enterprise. An example of a report might be a presentation of the revenue generated by products that have been recently developed. Another example might be the total amount of money spent on employee health insurance. Other functions might include preparing documents for a reader outside of the enterprise. One example of such a document might be a corporate tax return.

Decoupling components 106 are placed between the transactional layer 102 and the analytical layer 104. For example the decoupling components 106 can connect one or more objects or other entities in the transactional 102 and analytical 104 layers with each other. In some implementations, the decoupling components are links between at least one entity in the transactional layer and at least one entity in the analytical layer. Such links can themselves be entities in the system and can for example be represented by a relational table, such as a cross-classified table.

In one example, the decoupling components 106 may be transferred between the transactional layer and the analytical layer as simple object access protocol (SOAP) messages. SOAP messages are highly formatted text strings that contain a textual representation of an object or processing request. In this example the SOAP message might represent an object stored in the transaction layer 102. Computer program routines in the transactional 102 and analytical 104 layers may encode and decode the objects and requests as SOAP messages. Other routines may ensure that the message is available to routines in the other layer.

In another example, the decoupling components 106 can be part of a computer program, perhaps written in the Java programming language. The decoupling components can be links that are part of a computer program comprising the link information regarding the layers. Other programming languages than Java can be used. In another example, the decoupling components can include pointers to one or more aspects of the transactional system.

The transactional layer 102 here contains objects and processes. An example of an object might be a customer account. A chart of accounts 108, which may contain a group of customer accounts, is another exemplar. Exemplary processes may include user input functions, data transmission functions, data storage functions, and many others. Thus, when the transactional layer is being modified, the modification can involve altering or creating an object, a process, o both, to name a few examples.

The analytical layer 104 can include groups of relational tables 110, infocubes 112, reports, and key performance indicator variables 114. Relational tables 110 can be referred to as a data source. Relational tables 110 are those where data in one table refers, or relates, to data in another table. Database tables are one example of this, and relational tables 110 may also be found in computer programs, spreadsheet applications and many other forms. Infocubes 112 are multidimensional accumulations of data that can be used in data mining and report generation among other uses. Reports contain data that has been processed in some way. The data may be aggregated, combined with other data, filtered, and otherwise formatted to produce a report. Reports can be intended for people to read, but other uses are possible. Key performance indicators (KPI) 114 are metrics that can be used to evaluate the performance of an enterprise. They can be concretized as a single number, or in some circumstances be more complex. Exemplary KPIs 114 might be a company's total revenue, its innovation rate, or the revenue for each of its products.

Analytical layer 104 components (e.g. 110, 112, and 114) can be built on the decoupling components 106, rather than directly on the transactional layer 102 components. For example, a preconfigured analytical layer 104 report detailing the profit and loss for sales that have been invoiced relies upon invoices that are stored in the transactional layer. So a decoupling component 106 can be created, for example an invoice analytical component. The report draws its data from one or more of the decoupling components 106 that are placed between the report and the invoices, rather than directly from the invoices. This can provide the advantage that the analytical layer is less tightly coupled or integrated with the transactional layer and its proper operation can therefore be less dependent on changes that are made in the transactional layer.

The decoupling components 106 may be preconfigured by a software vendor or creator. Those who create or sell enterprise resource software often see it as an advantage if they can deliver their solution in a state that is ready to operate, or that will require relatively little preparation at the customer site to become operational. Part of the process of creating an out of the box solution could be that the vendor or creator (or distributor as the case may be) configures the decoupling components 106 prior to delivery of the system 100. For example, the software creator preconfigures the decoupling components 106 so that the invoiced profit report has access to the invoices.

The transactional layer 102 and analytical layer 104 components may be modified by a customer. Once the customer has purchased the system 100, special requirements may be found, which may not have been anticipated by the software creator or vendor. In this case, the customer may attempt to modify the components of the transactional layer 102 and the analytical layer 104. The modifications can involve one or more objects and/or one or more processes. For example, an existing object or an existing process can be modified by a user. As another example, a user can create a new object or create a new process.

As a particular example, the customer may have a unique customization scheme for a product that requires special invoices, and would also like to have the invoiced profit report to reflect details of said scheme. The customer makes modifications to the invoice in the transaction layer 102 to support the scheme. The customer also makes modifications to the report in the analytical layer 104. The report modifications rely upon the transaction layer 102 changes.

The system 100 detects the modification in the transaction layer 102 and determines whether at least one of the decoupling components 106 is implicated by the modified aspect. The system 100 then makes a predefined output. In our example, the system 100 detects that the customer is saving modifications to the invoices. In response, the system 100 discovers that a particular decoupling component 106 is configured to deliver invoice data from the transactional layer 102 to the analytical layer 104. The system 100 can subsequently launch a user interface warning that the decoupling component 106 may also be affected by the changes.

The customer may further modify the system 100 by making or modifying a logical connection between the decoupling component 106 and the modified transactional layer 102. As the last step in our example, the customer links the implicated decoupling component 106 to the modified invoices. Thus the connection from the invoices to the analytical components (e.g. 110, 112, and 114) depending on them can be maintained. In this example, the connection between the layers was maintained without a need to modify the analytical layer.

In some situations, by contrast, none of the decoupling components may be implicated by the modification. This can for example be the case when a new object or process is created in the transactional layer. Upon determining that there is no implication, the predefined output can be made to indicate that a new decoupling component can be created. For example, a guided process for creating the new decoupling component can be presented as part of a configuration procedure. The guided process can lead the user through one or more steps for creating a link between at least one entity in the transactional layer and at least one entity in the analytical layer. Such steps can include the necessary user guidance for identifying the correct entity or entities in the analytical layer that should receive data from the altered or newly created object or process in the transactional layer.

The modification process can take place during a configuration process, to name one example, including the display of the predefined output. Some examples of a configuration process include a wizard, and a single user interface form. A wizard displays multiple user interface forms sequentially. A user interface form can gather the links or other navigation tools for reaching the screens where configuration can be performed. Other examples are possible.

Figure 2:
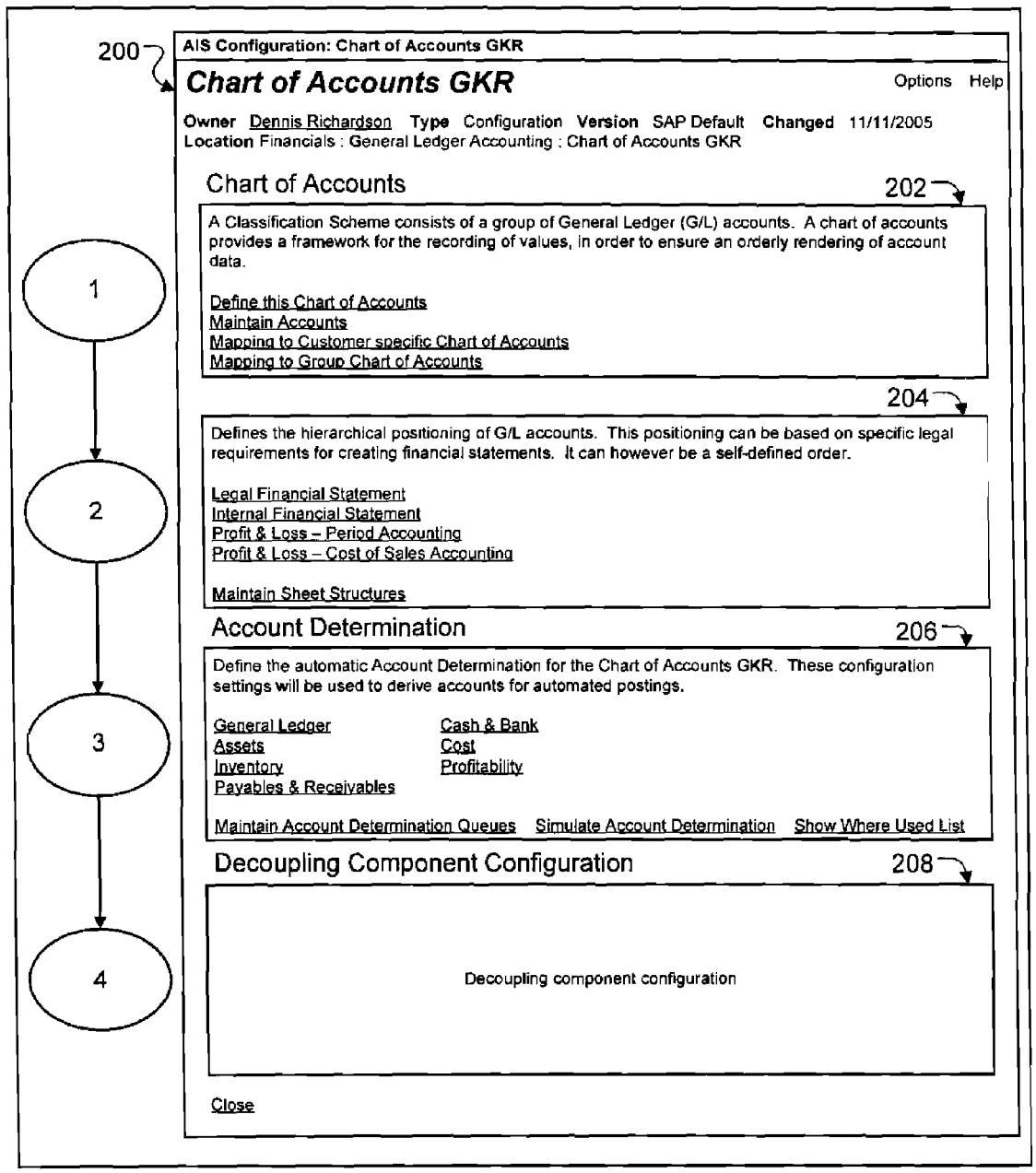
FIG. 2 shows an exemplary customization process for modifying an enterprise resource computing system.

FIG. 2 shows an exemplary customization process for modifying a Chart of Accounts. The process includes several steps or stages that can be initiated from a user interface form 200. The form 200 shows detailed information about the chart of accounts, including the owner, type, version, last change date, and its logical location in the system. The customization here proceeds in a series of four logically defined steps.

In the first step 202 of the exemplary process, the user modifies and defines the chart of accounts. A chart of accounts may provide the framework for recording data. More than one chart of accounts may exist in the system. Subtasks in this step may include defining a chart of accounts, maintaining accounts, mapping to a customer specific chart of accounts and mapping to group chart of accounts. These changes can be performed on one or more separate screens.

In the second step 204 of the process, the user modifies the balance sheet structure. This defines the hierarchical positioning of general ledger accounts. This may be based upon specific legal requirements for creating financial statements or it may be in a self defined order. Other orders may be possible. Some of the subtasks in this step may include creating legal and internal financial statements, creating profit and loss reports for period accounting or cost of sales accounting, and maintaining the sheet structure.

In the third step 206 of the process, the user modifies the account determination. These configuration settings may be used to derive accounts for automated postings. Some of the settings may be related to general ledger, assets, inventory, payables and receivables, cash and bank, cost, and profitability. Some of the tasks that may be performed in this step are maintaining account determination queues, simulating account determination, and showing where specific settings are used.

One or more of the changes above may affect a component or aspect of the transactional layer that is used, or relied on, by the analytical layer. The change(s) can therefore implicate one or more of the decoupling components. The user can be alerted to this in a fourth step 208. For example the system detects that the chart of accounts is being modified. The system then identifies the decoupling components that are implicated by the modification, and displays a predefined output to the user. In response the user may link the decoupling components of the system to specific accounts in the chart of accounts. As another example, if none of the decoupling components are implicated by the modification, the fourth step 208 can indicate to the user that a new decoupling component can be created.

Figure 3:
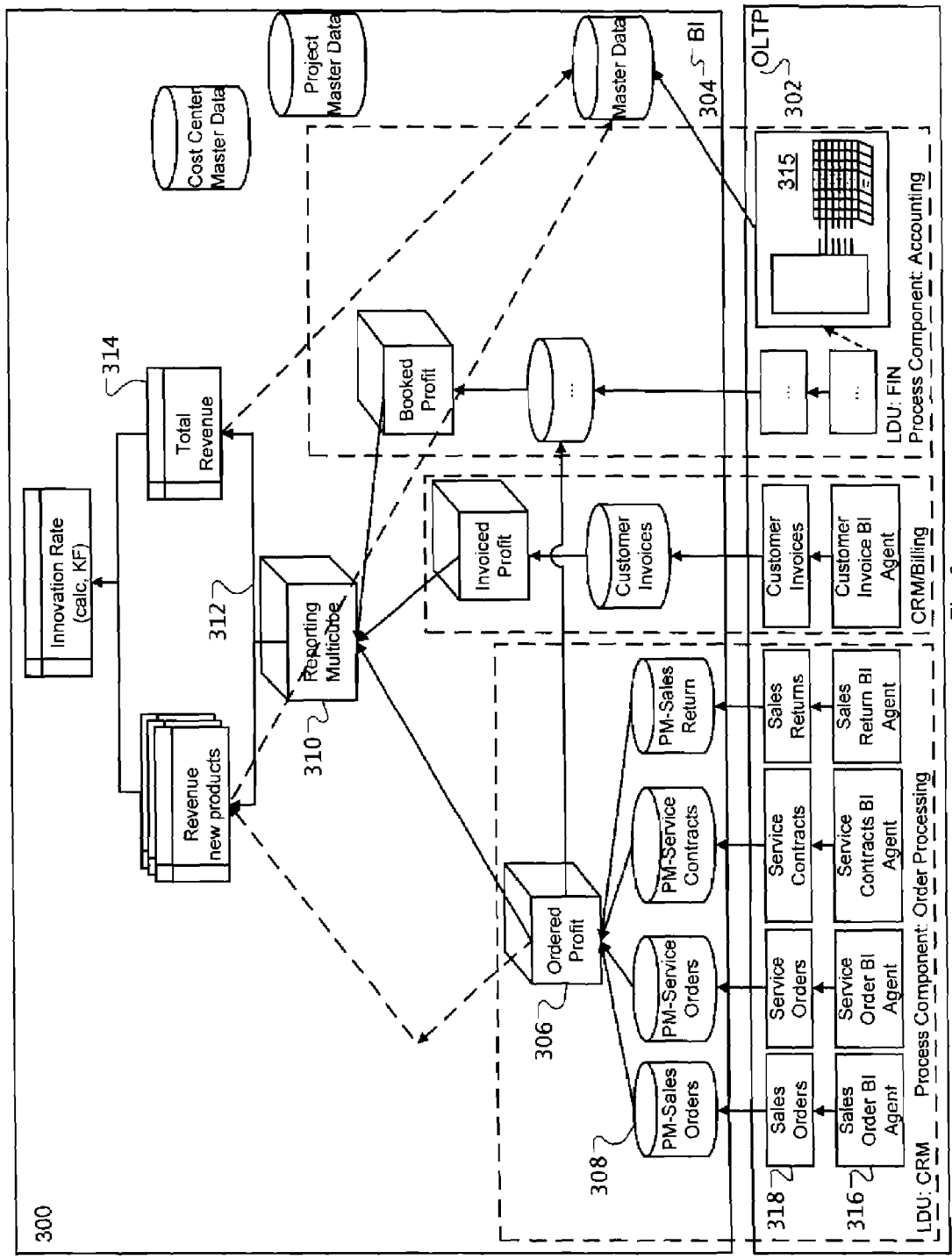
FIG. 3 is a component diagram showing an example a transactional layer and an analytical layer.

FIG. 3 is a component diagram 300 showing an example of data in a transactional layer 302 and in an analytical layer 304. Once data has been forwarded to the analytical layer 304 (e.g., by replication) the data may be processed into one or more of infocubes 306, data storage objects 308, multi-providers 310, queries 312, and key performance indicators 314. Such processing may include aggregation and modification, to name two examples. One or more decoupling components 315 can be included. For example, upon an object being created or altered in the transactional layer 302, this change can implicate one of the decoupling components 315. As a result, the user can be notified that the decoupling component should be mapped to (or otherwise directed at) the created or altered object.

In the transaction layer 302, one or more groups of BI Agents 316 may collect data from many sources. Such agents 316 may include sales order agents, service order agents, service contract agents, customer invoice agents, and many others. The BI Agents 316 may store data in one or more Data Source object 318. Examples of data source objects 318 include sales orders, service orders, service contracts, sales returns, customer invoices, and more.

From the Data Source objects 318 the data might move into Data Storage objects 308 in the analytical layer 304. Data storage objects 308 might contain operational data, such as customer invoices. They might also contain configuration data. Such data storage objects might contain master data, project master data or cost center master data. This movement can involve the use of decoupling components.

Data from the data storage objects 308 might then be processed to produce Infocubes 306. For example, data from the sales orders, service orders, service contracts, and sales return data storage objects might be aggregated to produce an Ordered Profit infocube. Data from the customer invoices data storage object might be processed into an Invoiced Profit infocube. Other data might become a Booked Profit infocube.

Infocubes 306 could be further processed into Multiproviders 310. For example the Ordered Profit, Invoiced Profit, Booked Profit and other infocubes could be aggregated into a Reporting Multicube. Data from infocubes may also be stored in Data Storage objects 308.

Queries 312 may be executed against the multiproviders 310 to produce reports and KPIs 314. These queries may access data directly from infocubes 306 or data storage objects 308. Some examples of reports and KPIs 314 are the revenue from new products and the total revenue. Reports and KPIs 314 may be queried to produce other reports and KPIs 314. An innovation rate report might query the new product revenue report and the total revenue KPI, for example.

The diagram also shows a BI agent 316 being modified in the transaction layer 302. The linkage between the BI Agent 316 and a decoupling component may be stored in the Master Data Storage Object in the analytical layer 304. As an example, at least one of the decoupling components 315 is here associated with an agent in a logical data unit (LDU) relating to a process component for accounting operations. Particularly, the decoupling component 315 can be implicated if any entity in the LDU (such as an agent) is altered or created. Upon detecting such a modification, the system can generate an output to a user that indicates the identified decoupling component. This can aid the user in ensuring that there is a proper connection to the analytical layer for this new or altered entity. A similar procedure can be carried out regarding any other LDU in the transactional layer 302.

Figure 4:
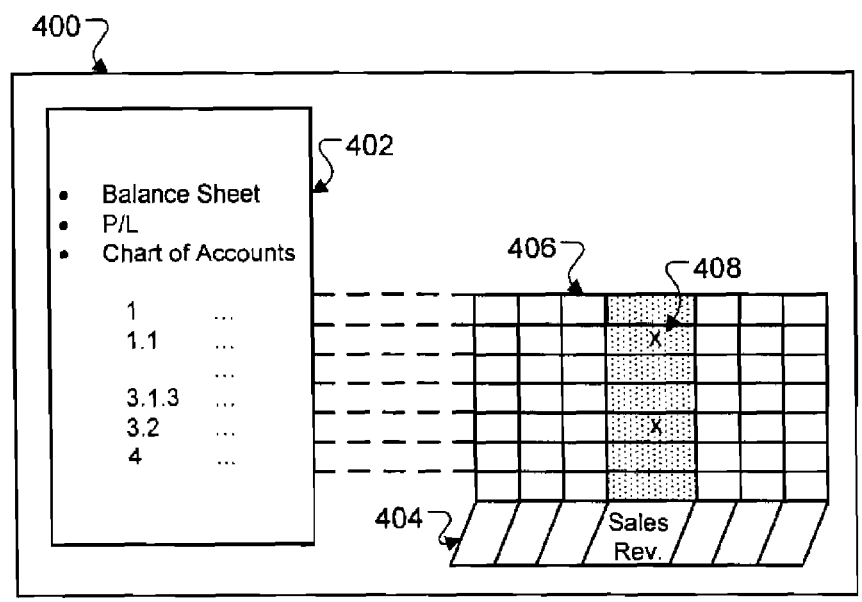
FIG. 4 is shows an example of the predefined output to the user.

FIG. 4 is an example of a predefined output 400 to the user. The predefined output 400 here shows a list of transactional components 402. In this example, the chart of accounts transactional component 108 has been modified in sections 1.1 and 3.1.3. The output 400 also shows a list of decoupling components 404 and can, for each modified component, indicate one or more of the decoupling components as implicated by the modification. Here, the Sales Rev. decoupling component has been implicated by the system 100 as being associated with the modified transactional layer 102 components. A chart 406 having a cell for each combination of transaction layer component and decoupling component can be displayed. The implication of the decoupling component by the changed aspect in the transaction layer 102 can be displayed in the output by an "X" 408 in the appropriate cell of the chart 400. Absence of an "X" 408 in a cell indicates that the decoupling component 106 was not so implicated, which in some implementations signifies that the decoupling component is not currently affected by any change(s) of the transactional layer. The system configurer may subsequently take action based upon the output 400.

Figure 5:
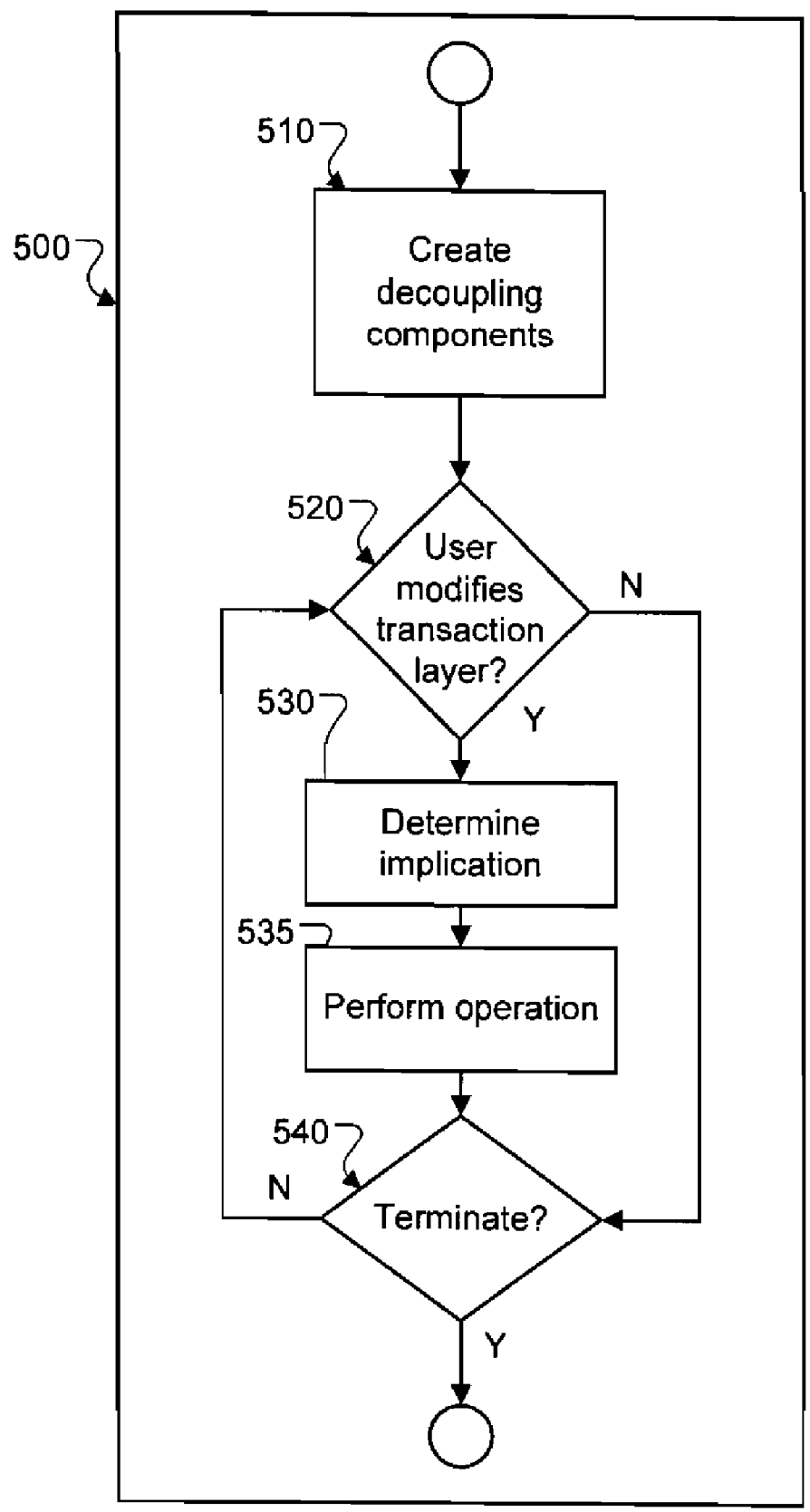
FIG. 5 is a flowchart of an exemplary modification process

FIG. 5 is a flowchart of an exemplary modification process 500. For example, the process 500 can be performed by a processor executing instructions stored in a computer-readable medium.

In step 510, decoupling components are created. For example, this can be done for one or more components before delivery of the enterprise resource computing system, and the component(s) can then be included in the enterprise resource computing system at the delivery as preconfigured content. For example, in the system 100 of FIG. 1 decoupling components 106 can be created for linking the chart of accounts 108 in the transaction layer 102 to the data source 110 in the analytical layer 104.

In step 520, the system detects whether an aspect is being modified in a transactional layer of an enterprise resource computing system. For example, the modification can be done as part of configuring the system. In some implementations, the modification can be the creation of a new object or process, or the altering of an existing object or process. In step 530 the system determines, in response to the detection, whether at least one of several decoupling components is implicated by the aspect. For example, a user modifies the chart of accounts 108 in the transaction layer 102 of the system 100 of FIG. 1. The system detects the modification, and checks a relational table that identifies at least one of the decoupling components 106 that are linked to the chart of accounts 108.

In step 535, the system performs an operation based on the determination. For example, the system makes a predefined output to a user that indicates the identified decoupling component. The output 400 of FIG. 4 is an example of the predefined output. As another example, the predefined output can indicate the possibility of creating a new decoupling component.

In step 540, the system checks for termination conditions. Examples of termination conditions might be a response to a user interface dialog asking the user to quit or continue, a system wide shutdown request, and a task completion indication.

Figure 6:
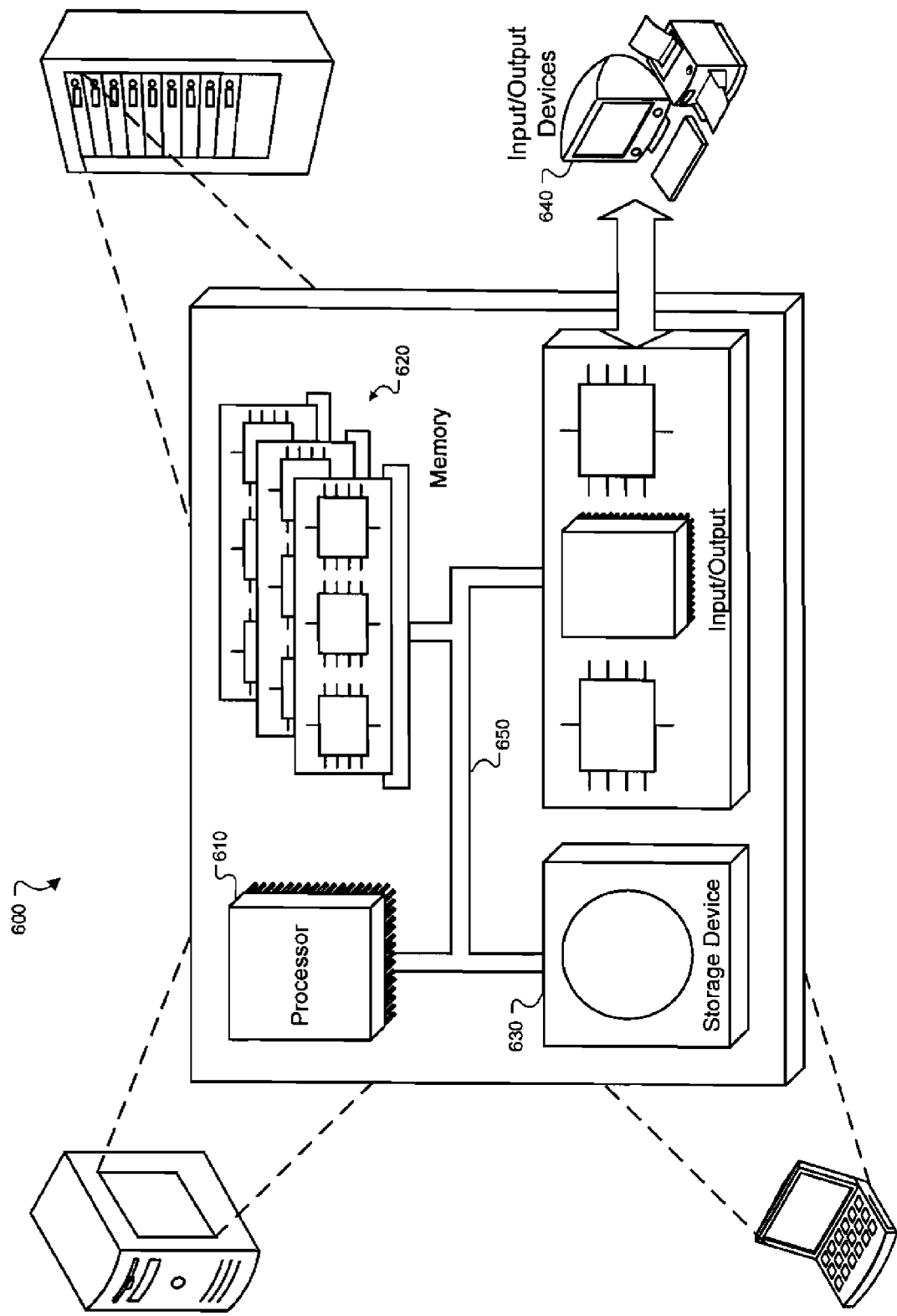
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640. The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for monitoring a connection between computer system layers, the method comprising:

detecting that an aspect is being modified in a transactional layer of an enterprise resource computing system, the enterprise resource computing system further including an analytical layer configured to receive data stored in the transactional layer from the transactional layer, wherein the analytical layer includes at least one entity selected from the group consisting of: a key performance indicator variable, a report, and a group of relational tables, the analytical layer processing the data received from the transactional layer, wherein the modified aspect is at least one of a data storage structure and a data storage process;

determining, in response to the detection, whether at least one of several decoupling components is implicated by the aspect, the decoupling components being configured for use by the analytical layer in receiving the data, wherein each of the decoupling components enables communication between the transactional layer and the analytical layer; and making a predefined output to a user based on the determination;

wherein the determination indicates that at least one of the decoupling components is implicated by the aspect, and wherein the predefined output identifies the at least one implicated decoupling component.

2. The method of claim 1, wherein the decoupling components are created before delivery of the enterprise resource computing system and included in the enterprise resource computing system at the delivery as preconfigured content.

3. The method of claim 2, further comprising receiving configuration changes to the transactional and analytical layers after the delivery and before the enterprise resource computing system is put to use.

4. The method of claim 1, wherein the detection is made of a modification selected from the group consisting of: creation of an object; modification of an existing object; creation of a process; and modification of an existing process.

5. The method of claim 1, further comprising:

detecting that another aspect in the transactional layer of the enterprise resource computing system is being modified, the other aspect also being at least one of the data storage structure and the data storage process;

performing another determination, in response to detecting modification of the other aspect, whether at least one of the several decoupling components is implicated by the other aspect, wherein the other determination indicates that none of the decoupling components are implicated by the other aspect; and making another predefined output based on the other determination, wherein the other predefined output indicates that a new decoupling component can be created.

6. The method of claim 1, further comprising receiving an additional modification of the transactional layer in response to making the predefined output, the additional modification establishing a logical connection between the identified decoupling component and the modified aspect.

7. The method of claim 6, wherein the modification of the aspect is done as part of a configuration process for the enterprise resource computing system, and wherein the predefined output is generated in a subsequent pan of the configuration process.

8. The method of claim 1, wherein the entity is built on at least one of the decoupling components.

9. The method of claim 1, wherein each of the decoupling components is a link between at least one entity in the transactional layer and at least one entity in the analytical layer.

10. A computer program product tangibly embodied in a machine-readable storage device and comprising instructions that when executed by a processor perform a method for monitoring a connection between computer system layers, the method comprising:

detecting that an aspect is being modified in a transactional layer of an enterprise resource computing system, the enterprise resource computing system further including an analytical layer configured to receive data stored in the transactional layer from the transactional layer, wherein the analytical layer includes at least one entity selected from the group consisting of: a key performance indicator variable, a report, and a group of relational tables, the analytical layer processing data received from the transactional layer, and the aspect modified in the transactional layer being at least one of a data storage structure and a data storage process;

determining, in response to the detection, whether any of several decoupling components is implicated by the aspect, the decoupling components being configured for use by the analytical layer in receiving the data, wherein each of the decoupling components enables communication between the transactional layer and the analytical layer; and making a predefined output to a user based on the determination;

wherein the determination indicates that at least one of the decoupling components is implicated by the aspect, and wherein the predefined output identifies the at least one implicated decoupling component.

11. An enterprise resource computing system comprising:

at least one data storage device storing at least a first set of instructions;

a processor configured to execute instructions stored in the at least one data storage device, wherein execution of the first set of instructions causes the processor to create:

a transactional layer that stores data and includes an aspect comprising at least one of a data storage structure and a data storage process; and an analytical layer configured to receive data from the transactional layer and to process the received data, wherein the analytical layer includes at least one entity selected from the group consisting of: a key performance indicator variable, a report, and a group of relational tables; and decoupling components for use by the analytical layer in receiving the data, wherein each of the decoupling components enables communication between the transactional layer and the analytical layer, wherein upon the aspect of the transactional layer being modified, a predefined output is made to a user based on a determination that at least one of the decoupling components is implicated by the aspect, wherein the predefined output identifies the at least one implicated decoupling component.

12. The enterprise resource computing system of claim 11, wherein the decoupling components are created before delivery of the enterprise resource computing system and included in the enterprise resource computing system at the delivery as preconfigured content.

13. The enterprise resource computing system of claim 11, wherein configuration changes to the transactional and analytical layers are received after the delivery and before the enterprise resource computing system is put to use.

14. The enterprise resource computing system of claim 11, wherein the modification is selected from the group consisting of: creation of an object; modification of an existing object; creation of a process; and modification of an existing process.

15. The enterprise resource computing system of claim 11, wherein another aspect in the transactional layer of the enterprise resource computing system also being at least one of the data storage structure and the data storage process is being modified;

wherein another determination is performed, in response to detecting modification of the other aspect, whether at least one of the several decoupling components is implicated by the other aspect. wherein the other determination indicates that none of the decoupling components are implicated by the aspect; and wherein another predefined output is made that indicates that a new decoupling component can be created.

16. The enterprise resource computing system of claim 11, wherein an additional modification of the transactional layer is received in response to the predefined output, the additional modification establishing a logical connection between the identified decoupling component and the modified aspect.

17. The enterprise resource computing system of claim 16, wherein the modification of the aspect is done as part of a configuration process for the enterprise resource computing system, and wherein the predefined output is generated in a subsequent part of the configuration process.

18. The enterprise resource computing system of claim 11, wherein the entity is built on at least one of the decoupling components.

19. The enterprise resource computing system of claim 11, wherein each of the decoupling components is a link between at least one entity in the transactional layer and at least one entity in the analytical layer.

* * * * *

UNITED STATES PATENT AND TRADEMARK OFFICE
CERTIFICATE OF CORRECTION

PATENT NO.       : 7,653,661 B2                                       Page 1 of 1
APPLICATION NO.  : 11/618454
DATED            : January 26, 2010
INVENTOR(S)      : Razvi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 402 days.

Signed and Sealed this

Twenty-third Day of November, 2010

David J. Kappos
*Director of the United States Patent and Trademark Office*